United States Patent
Li et al.

(10) Patent No.: US 9,317,595 B2
(45) Date of Patent: Apr. 19, 2016

(54) FAST TITLE/SUMMARY EXTRACTION FROM LONG DESCRIPTIONS

(75) Inventors: Xin Li, Sunnyvale, CA (US); Hongjian Zhao, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1265 days.

(21) Appl. No.: 12/960,828

(22) Filed: Dec. 6, 2010

(65) Prior Publication Data
US 2012/0143595 A1 Jun. 7, 2012

(51) Int. Cl.
G06F 17/28 (2006.01)
G06F 17/30 (2006.01)
G06F 17/27 (2006.01)

(52) U.S. Cl.
CPC ...... *G06F 17/30719* (2013.01); *G06F 17/2775* (2013.01)

(58) Field of Classification Search
CPC ... G06F 17/00; G06F 30/00; G06F 17/30864; G06F 17/30719; G06F 17/3053; G06F 17/2247; G06F 17/2264; G06F 8/24; G06F 8/30; G06F 8/65; G06F 17/2775; G06F 17/30572; G06F 17/30601; G06F 17/30604; G06F 17/30702; G06F 17/30; G06F 17/30477; G06F 17/30899
USPC ............ 704/1–10, E11.001, 9, E17.119, 769, 704/999.107
See application file for complete search history.

(56) References Cited

U.S. PATENT DOCUMENTS

| | | | |
|---|---|---|---|
| 4,914,590 A * | 4/1990 | Loatman et al. ................... 704/8 |
| 5,614,899 A | 3/1997 | Tokuda et al. |
| 5,696,916 A | 12/1997 | Yamazaki |
| 5,727,222 A * | 3/1998 | Maxwell, III ...................... 704/9 |
| 5,819,210 A * | 10/1998 | Maxwell et al. ................... 704/9 |
| 5,903,860 A * | 5/1999 | Maxwell et al. ................... 704/9 |
| 6,064,953 A * | 5/2000 | Maxwell et al. ................... 704/9 |
| 6,167,370 A | 12/2000 | Tsourikov et al. |
| 6,169,972 B1 | 1/2001 | Kono et al. |
| 6,205,456 B1 * | 3/2001 | Nakao ............... G06F 17/30719 707/999.003 |
| 6,295,529 B1 | 9/2001 | Corston-Oliver et al. |
| 6,317,708 B1 * | 11/2001 | Witbrock et al. ................. 704/9 |
| 6,349,316 B2 * | 2/2002 | Fein ....................... 707/E17.094 |
| 6,654,738 B2 | 11/2003 | Nishioka et al. |
| 7,036,075 B2 * | 4/2006 | Walker .......................... 715/201 |

(Continued)

OTHER PUBLICATIONS

Knight, K. and Marcu, D., "Statistics-Based Summarization—Step One: Sentence Compression," 2000, American Association for Artificial Intelligence Conference, pp. 703-710.*

(Continued)

*Primary Examiner* — Abdelali Serrou
(74) *Attorney, Agent, or Firm* — Hickman Palermo Becker Bingham LLP (57) ABSTRACT

Techniques are described herein for automatic generation of a title or summary from a long body of text. A grammatical tree representing one or more sentences of the long body of text is generated. One or more nodes from the grammatical tree are selected to be removed. According to one embodiment, a particular node is selected to be removed based on its position in the grammatical tree and its node-type, where the node type represents a grammatical element of the sentence. Once the particular node is selected, a branch of the tree is cut at the node. After branch has been cut, one or more sub-sentences are generated from the remaining nodes in the grammatical tree. The one or more sub-sentences may be returned as a title or summary.

20 Claims, 6 Drawing Sheets

(56) References Cited

U.S. PATENT DOCUMENTS

| | | | |
|---|---|---|---|
| 7,391,730 B1* | 6/2008 | Chandra et al. | 370/236 |
| 7,587,309 B1* | 9/2009 | Rohrs et al. | 704/10 |
| 7,610,190 B2* | 10/2009 | Polanyi et al. | 704/9 |
| 7,698,125 B2* | 4/2010 | Graehl et al. | 704/5 |
| 7,730,088 B2* | 6/2010 | Mittal | G06F 17/30938 707/778 |
| 8,515,733 B2* | 8/2013 | Jansen | 704/9 |
| 8,543,992 B2* | 9/2013 | Jiang et al. | 717/149 |
| 2002/0032677 A1 | 3/2002 | Morgenthaler et al. | |
| 2002/0046018 A1* | 4/2002 | Marcu et al. | 704/9 |
| 2002/0078090 A1* | 6/2002 | Hwang | G06F 17/30719 715/201 |
| 2002/0087985 A1* | 7/2002 | Kamen et al. | 725/39 |
| 2002/0194230 A1* | 12/2002 | Polanyi | G06F 17/277 704/9 |
| 2003/0093275 A1* | 5/2003 | Polanyi et al. | 704/251 |
| 2003/0130837 A1* | 7/2003 | Batchilo et al. | 704/9 |
| 2003/0163790 A1* | 8/2003 | Murata | G06F 17/30719 715/210 |
| 2003/0167266 A1 | 9/2003 | Saldanha | |
| 2003/0204515 A1 | 10/2003 | Shadmon et al. | |
| 2003/0233224 A1 | 12/2003 | Marchisio et al. | |
| 2004/0044519 A1* | 3/2004 | Polanyi et al. | 704/9 |
| 2004/0083092 A1 | 4/2004 | Valles | |
| 2004/0113953 A1* | 6/2004 | Newman | 345/853 |
| 2004/0117340 A1* | 6/2004 | Blitzer | 707/1 |
| 2005/0055355 A1 | 3/2005 | Murthy et al. | |
| 2005/0060139 A1* | 3/2005 | Corston-Oliver et al. | 704/1 |
| 2005/0071150 A1 | 3/2005 | Nasypny | |
| 2005/0138556 A1* | 6/2005 | Brun et al. | 715/536 |
| 2005/0154580 A1 | 7/2005 | Horowitz et al. | |
| 2005/0210048 A1* | 9/2005 | Beres et al. | 707/100 |
| 2006/0047656 A1 | 3/2006 | Dehlinger et al. | |
| 2006/0106832 A1 | 5/2006 | Ben-Dyke et al. | |
| 2007/0016898 A1* | 1/2007 | Derby et al. | 717/144 |
| 2007/0260450 A1* | 11/2007 | Sun | 704/9 |
| 2008/0126078 A1* | 5/2008 | Starkie | 704/9 |
| 2008/0270119 A1* | 10/2008 | Suzuki | 704/9 |
| 2009/0112892 A1* | 4/2009 | Cardie et al. | 707/100 |

OTHER PUBLICATIONS

Meng Wang, Chungui Li and Xiaorong Wang, "Chinese Automatic Summarization Based on Thematic Sentence Discovery", 2007, Fuzzy Systems and Knowledge discovery.*

* cited by examiner

FAST TITLE/SUMMARY EXTRACTION FROM LONG DESCRIPTIONS

CROSS-REFERENCE TO RELATED APPLICATIONS

Benefit Claim

This application is related to application Ser. No. 11/418,886, filed May 3, 2006 (Published U.S. Pat. App. No. 2007/0260450), entitled "Indexing Parsed Natural Language Texts for Advanced Search," the entire contents of which is hereby incorporated by reference as if fully set forth herein.

FIELD OF THE INVENTION

Embodiments relate generally to natural language processing, and, more specifically, to generating titles or summaries from long descriptions.

BACKGROUND

It is often useful to provide a summary or descriptive title for a long body of text in order to present a brief synopsis to a reader. A summary is a shortened version of an original. Ideally, the summary conveys the most important or relevant information from the original. Thus, the summary helps a reader quickly understand the main ideas of the original, longer version. A title is similar to a summary, except a title is generally shorter than a summary and conveys less detailed information. Ideally, a title entices the reader to read an article or view an object associated with the title.

Sometimes, titles/summaries are space-limited to a threshold number of words, characters, and/or bytes. For example, in response to a search request, a search engine displays the title and summary for each corresponding search result of a set of search results. In order to provide a compact display of the search results in a format that is easy to analyze by an end user, the title and summary for each search result are restricted to be no longer than a threshold number of characters.

As another example, news websites may include photo slideshows, which contain images, such as photographs, arranged in sequence for presenting to an end user. Each image in the slideshow is generally associated with a long description of text, such as a description of the image or a news story associated with the image. When displaying a particular image to an end user, it is helpful to also show information about the previous image and next image in the slideshow. For instance, a descriptive title for these images may be generated based on the news story associated with the images. In order to ensure the title/summary of the previous image or next image fits within a certain display element, the title/summary is generally space-limited to a specific number of characters. Ideally, the descriptive titles should pique the reader's interest in viewing a photo in the slideshow.

According to one approach, titles and/or summaries are human-generated. For example, a human may read through a long description of text to determine and generate a title and/or summary that conveys the most important or relevant information from the original. Although this approach can produce high-quality titles/summaries depending on the person employed to perform the task, human-generated titles are inefficient and expensive. The task of determining an appropriate descriptive title/summary within a specified number of characters is both challenging and time-consuming.

According to another approach, the first sentence of a long body of text is used to generate a title/summary. If the summary is space-limited, the first sentence is truncated after the maximum number of words, character, and/or bytes. This approach is more efficient than the human-generated title approach; however, it often leads to awkward titles. For example, if the first sentence of an article is "Bob lives in Sunnyvale and is a software engineer at Yahoo!" and the words "engineer at Yahoo!" are truncated due to space-limitations, the descriptive title would be "Bob lives in Sunnyvale and is a software." Because "software" and "engineer" are separated by the truncation, the title becomes confusing and grammatically incorrect.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
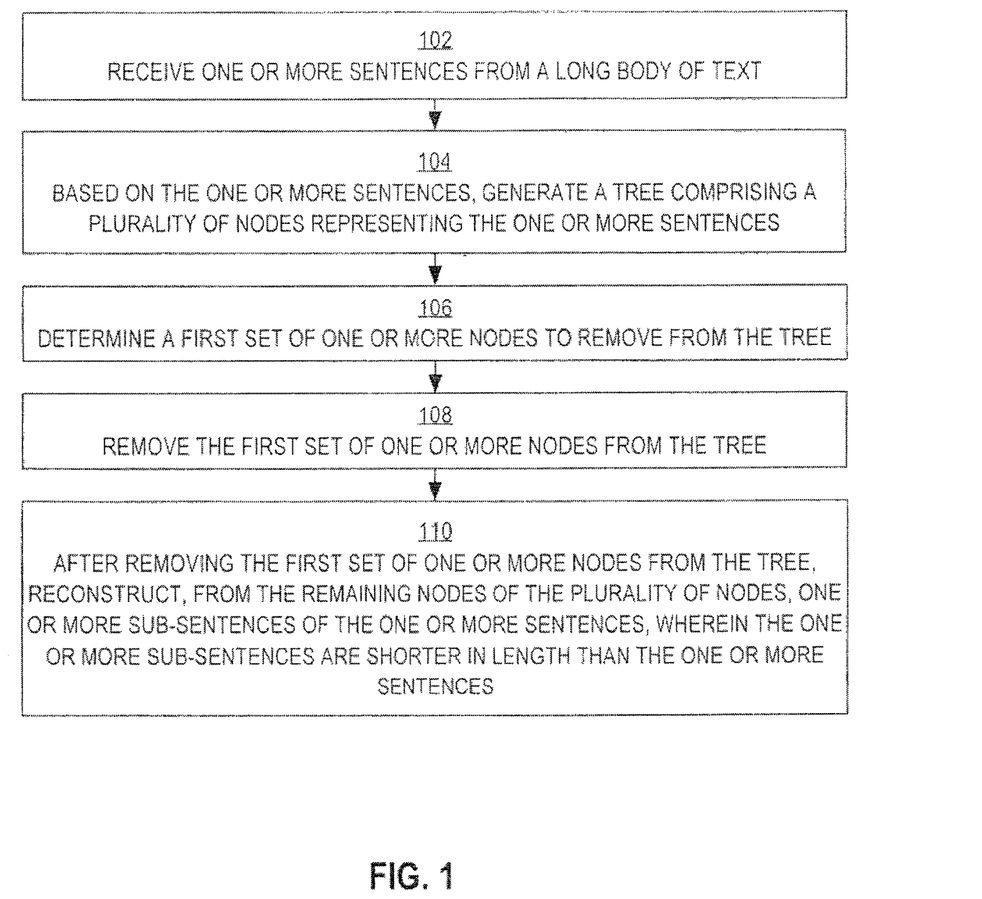
FIG. 1 is a flow diagram that illustrates a technique for generating a title or summary based on a tree.

Techniques are described herein for automatic generation of a title or summary from a long body of text. FIG. 1 illustrates a technique, according to one embodiment, for automatically generating a title or summary from a long body of text. In step 102, one or more sentences are received from a long body of text from which a title or summary is to be extracted.

In step 104, based on the one or more sentences, a tree is generated, which includes a plurality of nodes. According to one embodiment, the structure of the tree and its respective nodes represents a grammatical structure of the one or more sentences. For example, the tree may represent the grammatical structure of the one or more sentences according to the syntax of the input language (e.g., the English language). The nodes of the tree may represent specific grammatical elements of the grammatical structure. The tree may be referred to as a parse tree, concrete syntax tree, or grammatical tree.

After the tree has been generated, in step 106, a first set of one or more nodes from the tree is determined to be removed from the tree. The one or more nodes may be selected based on the grammatical structure of the sentences represented by the tree. According to one embodiment, determining which set of nodes to remove is based, at least in part, on the position and node type of at least one node from the set of one or more nodes to be removed.

In step 108, once the first set of one or more nodes for removal is determined, the first set of one or more nodes is removed from the tree.

After the first set of one or more nodes are removed from the tree, in step 110, one or more sub-sentences of the one or more sentences are reconstructed from the remaining nodes of the tree, wherein the one or more sub-sentences are shorter than the one or more sentences. The one or more sub-sentences are returned as a title or summary for the long description of text. According to one embodiment, if the lengths of the one or more sub-sentences still exceed a threshold size (e.g., words, characters, or bytes), than steps 102-108 are repeated until the lengths of the one or more sub-sentences are below the threshold.

In one embodiment, a Named Entity Recognizer (NER) may also be used to generate and/or adjust the title/summary. The NER is used to identify particular named entities, such as (but not restricted to) names of people, organizations, or locations, within a sentence. If a particular node or its children (i.e., a particular branch of a tree) include a named entity, then that node may be given non-removal preference over a node or branch that does not include a named entity when determining a set of nodes to remove from the tree.

According to an embodiment, a set of one or more words may be removed from the sentence before generating the grammatical tree. For example, certain specified words or phrases that are determined to be trivial or that may cause the parser to generate an incorrect grammatical tree may be removed by preprocessing the one or more sentences before the tree is generated.

Grammatical Tree

According to techniques described herein, a grammatical tree is generated based on one or more sentences from a long body of text such as a text corpus. A Natural Language Processing tool, a parser, decomposes a sentence into its grammatical constituents (also referred to herein as grammatical elements) to generate the grammatical tree. A commercially or otherwise available parser, such as the "Stanford Parser", may be used to generate the grammatical tree.

In one embodiment, one or more sentences from the text corpus are parsed using the parser. For example, a first set of one or more sentences from the text corpus (e.g., the first sentence of a news story) may be sent to the parser to decompose the one or more sentences into their grammatical constituents and generate a grammatical tree.

To decompose the sentences, the parser analyzes the text of the one or more sentences to determine the grammatical structure of the one or more sentences. According to an embodiment, determining the grammatical structure comprises determining the grammatical elements of a sentence. For example, based on the analysis, the parser may determine which groups of words of the one or more sentences go together (such as "phrases") and which words are the subject or object of a verb. The parser may also determine the parts-of-speech for each word in the one or more sentences. According to one embodiment, the grammatical structure is determined based, at least in part, on the input language of the one or more sentences. For example, the Stanford Parser may generate a parse tree for sentences in Arabic, Chinese, or English.

A grammatical tree is generated based on the grammatical structure determined by the analysis. According to one embodiment, generating the grammatical tree comprises generating a Treebank of the one or more sentences of the text corpus, where generating the Treebank includes annotating the one or more sentences with grammatical structure. In one embodiment, the one or more sentences are annotated according to Penn Treebank notation using Penn Treebank Tags. Other notation formats may also be used, such as ICE-GB.

As an illustration, the following sentence might be decomposed by the parser: Bob is a software engineer with Yahoo in Sunnyvale.

Figure 3A:
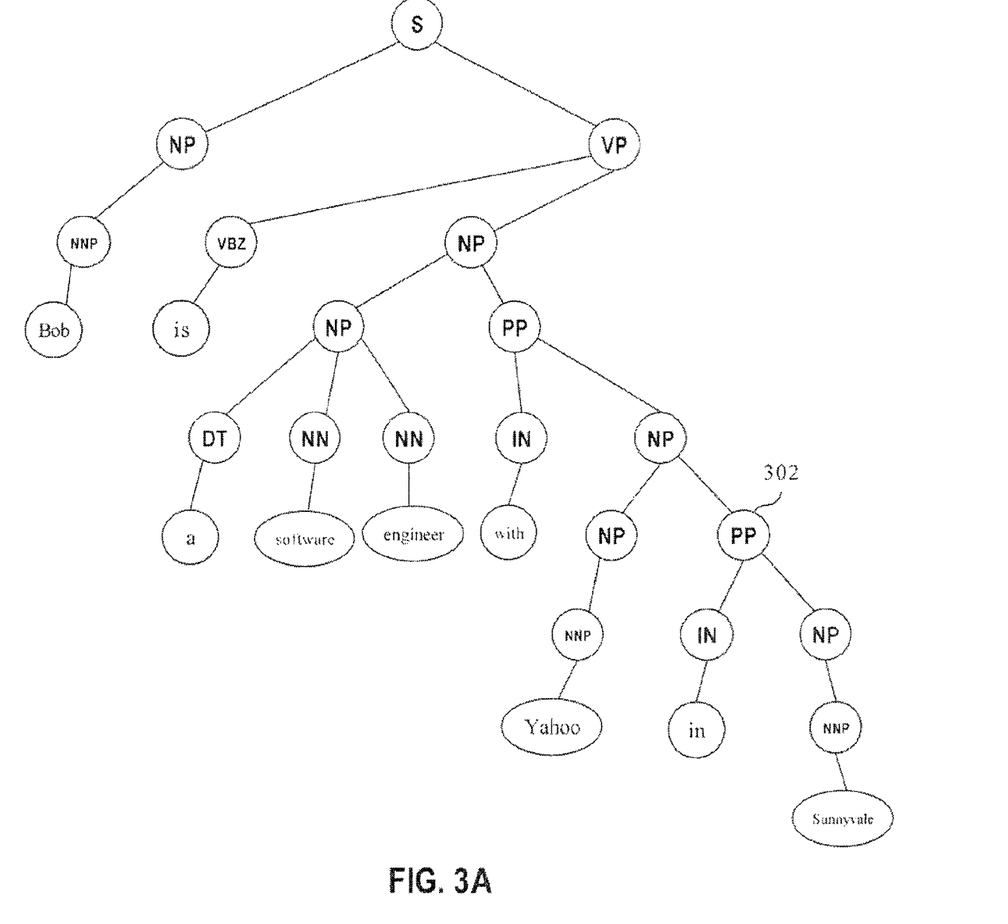
FIGS. 3A, 3B, and 3C are graphical representations of a grammatical tree and illustrate the removal of nodes from the grammatical tree to generate a title or summary.

The Stanford Parser outputs the following grammatical tree:

```
(ROOT
    (S
        (NP (NNP Bob))
        (VP (VBZ is)
            (NP
                (NP
                    (NP (DT a) (NN software) (NN engineer))
                    (PP (IN with)
                        (NP
                            (NP (NNP Yahoo))
                            (PP (IN in)
                                (NP (NNP Sunnyvale)))))))
        (. .)))
```

FIG. 3A illustrates an example graphical representation of the above grammatical tree output by the parser. In the example, the grammatical tree represents the grammatical structure of the sentence "Bob is a software engineer with Yahoo in Sunnyvale." The grammatical tree comprises a plurality of nodes, which includes nodes of varying node-types that represent specific grammatical elements of the sentence. For example, the grammatical tree illustrated in FIG. 3A contains the following phrase-level node-types: NP: Noun Phrase; VP: Verb Phrase; PP: Prepositional Phrase; and the following word-level node types: VBZ-Verb, 3rd person singular present; DT: Determiner; NN: Noun, singular or mass; NNP: Proper noun, singular. More explanation of node-types and their abbreviations are described in "Penn Treebank II Tags", which is referenced above. The top NP-type node of the grammatical tree corresponds to the subject of the entire sentence. The top VP-type node of the grammatical tree contains a verb (is) and an object. Thus, the grammatical tree clearly shows the role that each word plays in the sentence.

Automatic Title/Summary Generation

Once a grammatical tree has been generated for the one or more sentences, a title or summary may be generated based on the grammatical structure of the one or more sentences represented by the grammatical tree. In order to generate the title/summary, nodes are systematically removed from the tree based on one or more criteria.

According to an embodiment, a set of nodes is selected to be removed from the tree based, at least in part, on the node-type of at least one node of the set of nodes. Certain classes of nodes represent grammatical elements of a sentence that are generally used to pass "less important" information. For example, some grammatical elements are generally used to give additional, more detailed information, which may be removed from the sentence without significantly altering its meaning. In general, these node-types (and their associated Penn Treebank tags) are: Prepositional Phrases (PP); Quantifier Phrases (QP); Adjective Phrase (ADJP); Adverb Phrase (ADVP); and certain types of clauses such as Clauses introduced by a (possibly empty) subordinating conjunction (SBAR). Conversely, the top NP and top VP nodes in a grammatical tree are generally used to pass more important, detail-related information in a sentence.

Nodes having "less important" node-types are herein referred to as "secondary class" nodes. It will be recognized by a person having ordinary skill in the art that the node-types classified as secondary class may vary from implementation to implementation and may be configured based on the application for which a title/summary is being generated. For example, a first set of node-types may be classified as "second class" if extracting a title from a news story, while a second set of node-types, different from the first, may be classified as "second class" if extracting a summary of a search hit. Also, nodes of the same node-type may be treated differently based on their child nodes. For example, nodes of node-type Prepositional Phrase (PP) that contain the preposition "of" may be excluded from classification as "secondary class", while all other nodes of node-type PP are considered secondary class nodes.

According to one embodiment, a set of nodes is selected to be removed from the tree based, at least in part, on the position of at least one node of the set of nodes to be removed. In general, the lower the position of a node in the grammatical tree, the more detailed information the node conveys. Also, the closer to the end of the sentence the node is, the "less important" information it passes. A position closest to the end of the sentence corresponds to the rightmost node position in the tree.

Figure 2:
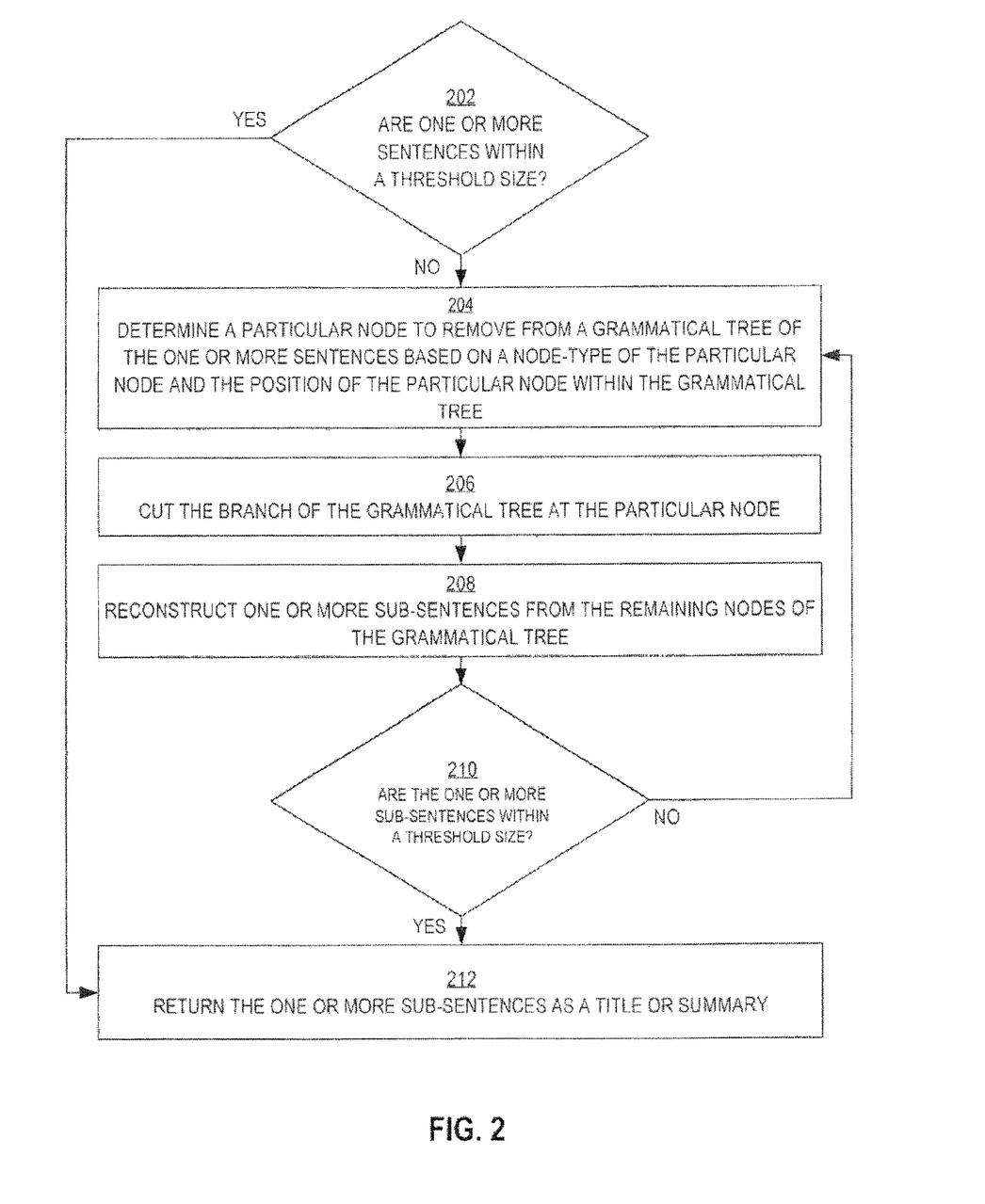
FIG. 2 is a flow diagram that illustrates a technique for generating a space-limited title or summary based on a grammatical tree.

In certain embodiments, the title/summary may be space-limited (or length limited) to a certain number of bytes, characters, or words. FIG. 2 illustrates a process for automatically generating, based on a grammatical tree, a space-limited title or summary from a sentence of a text corpus. In step 202, it is determined whether the one or more sentences are within a given size limit ("the maximum threshold size"). If the one or more sentences received as input for the parser are already within the given size limit, then the one or more sentences may be returned directly (step 212). However, if the one or more sentences exceed the maximum threshold size, then a grammatical tree for the one or more sentences is generated and the process continues with step 204.

In step 204, a particular node is selected for removal based, at least in part, on the node-type of the particular node and the position of the particular node in the grammatical tree. According to one embodiment, the lowest-level secondary class node (i.e. a node with a secondary class node-type) is identified and selected to be cut first. If multiple secondary class nodes are on the same level in the tree, then the rightmost one is selected as the node to be removed. In one embodiment, secondary class node-types include Prepositional Phrases (PP); Quantifier Phrases (QP); Adjective Phrase (ADJP); Adverb Phrase (ADVP); and dependent clauses, such as Clauses introduced by a (possibly empty) subordinating conjunction (SBAR). However, as noted above, the secondary class node-types may vary from implementation to implementation, and may depend on the application for which a title or summary is to be extracted. Furthermore, certain node-types may be weighted differently. For example, the Adverb Phrases (ADVP) node-type may have a different weight than the Adjective Phrase (ADJP) node type, causing all nodes of Adverb Phrase node-type to be cut before any nodes of Adjective Phrase (ADJP) node-type, even if the nodes of Adverb Phrase node-type are at a higher level in the tree. If all nodes having a secondary class node-type have been removed then nodes of other node-types may be selected for removal, according to techniques described below.

In step 206, the branch of the tree is cut at the node selected in step 204. Cutting the branch at a particular node removes the particular node and all its children from the grammatical tree.

In step 208, one or more sub-sentences are reconstructed from the remaining nodes of the tree (i.e., the nodes that have not been cut or removed from the tree). Because branches have been cut from the tree and nodes removed, the one or more sub-sentences will be shorter than the original one or more sentences that were parsed by the parser.

In step 210, it is determined whether the sub-sentence is within the maximum threshold size. For example, the character count, word count, or size of the reconstructed sub-sentence is determined and compared to the maximum threshold size. If the sub-sentence is within the maximum threshold size, then it is returned as a title or summary for the sentence in step 212. If it is not within the threshold size, then the process returns to step 204, and the process shown in steps 204-212 is repeated to remove additional nodes from the tree.

Figure 3B:
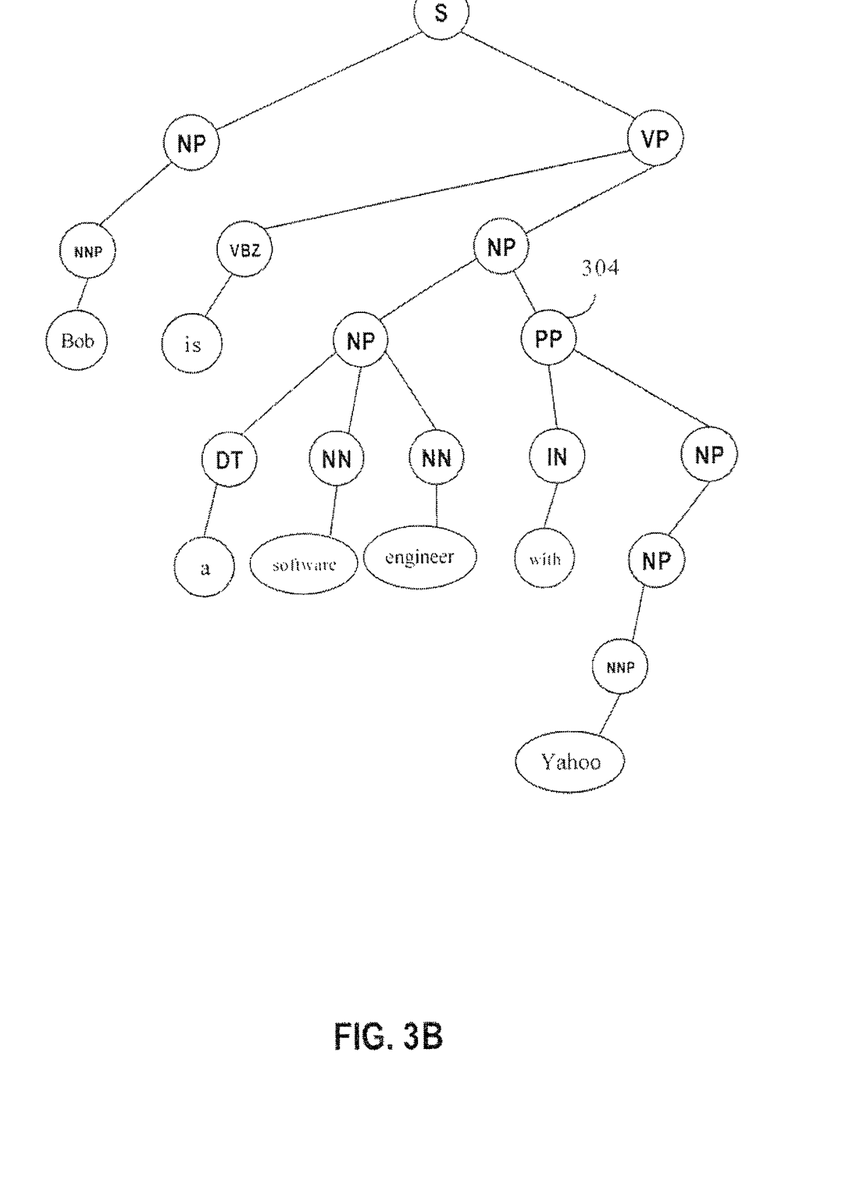
Figure 3C:
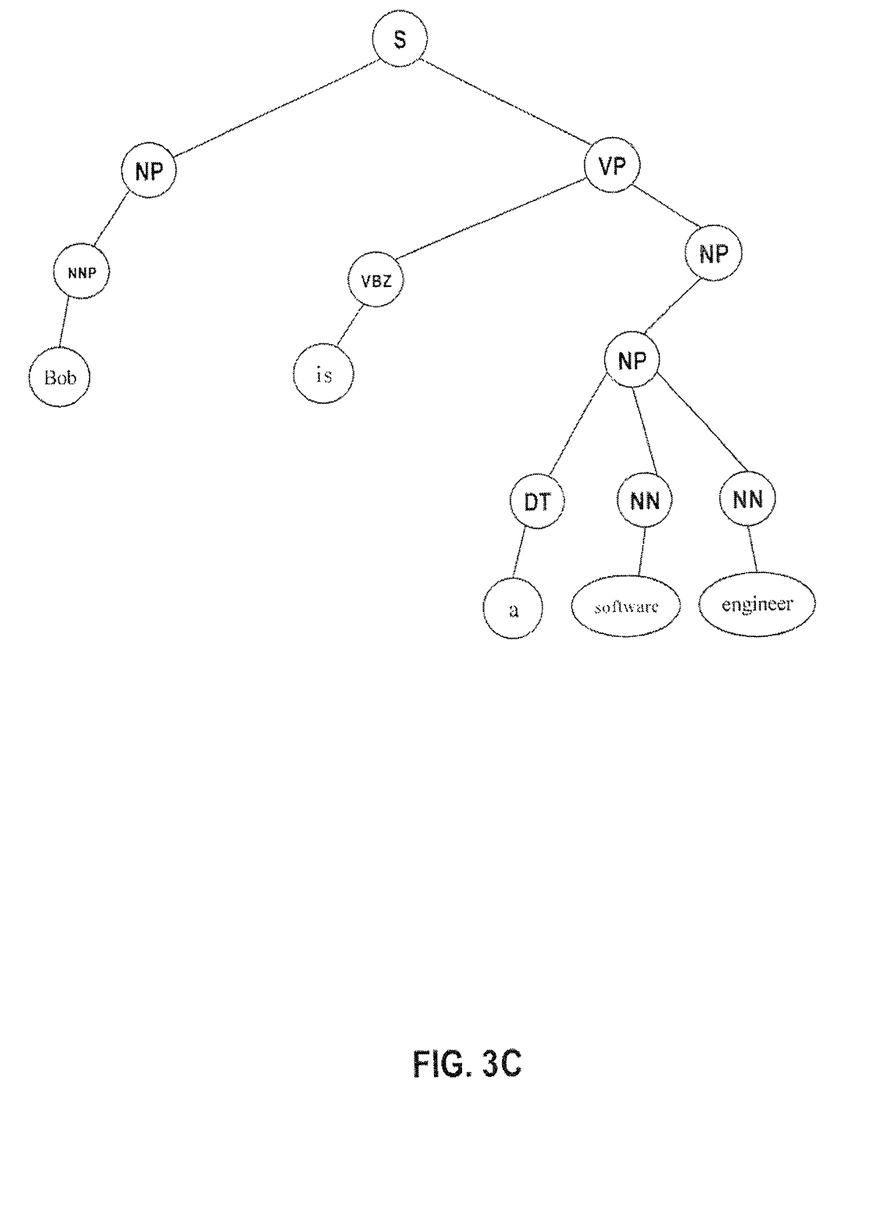

As an illustration, FIG. 3A shows a graphical representation of a grammatical tree for the sentence: "Bob is a software engineer with Yahoo in Sunnyvale." In this example, a title/summary needs to be extracted that is thirty characters or less, including spaces. Also in this example, nodes of node-type PP, QP, DJP, ADVP; and SBAR have been classified as secondary class nodes. A branch of the grammatical tree is cut at node 302, because node 302 has a node-type PP and is the lowest level secondary class node in the grammatical tree. Cutting the tree at node 302 removes node 302 and all its children, resulting in the modified grammatical tree as illustrated in FIG. 3B. After the branch has been cut, a sub-sentence is reconstructed based on the remaining nodes in the tree. Thus, the reconstructed sub-sentence would read "Bob is a software engineer with Yahoo." This sub-sentence is still over thirty characters in length. Therefore, the process of finding secondary class nodes to remove would repeat. Continuing with the example, a branch of the tree at node 304 is selected, because node 304 has a node-type PP and is now the lowest level secondary class node in the grammatical tree. After the tree has been cut at node 304, a sub-sentence is reconstructed from the remaining nodes, as illustrated in FIG. 3C. Thus, the reconstructed sub-sentence would read "Bob is a software engineer." This sub-sentence is less than the thirty character limit. Therefore, it is returned as the title or summary. In one embodiment and according to techniques described further below, nodes of node-type DT such as "a" or "the" may also be removed before the title is returned.

Entity-Centric Title Generation

In one embodiment, one or more named entities may be identified in the one or more sentences (or one or more sub-sentences) using a Named Entity Recognizer (NER). The NER receives the one or more sentences as inputs, and outputs recognized named entities, including person names, organization names, and location names. Another NER may also output movies names, product names, and so on. For example, for the sentence Bob is a Software Engineer at Yahoo, the named entity recognizer will output:
Person: Bob
Organization: Yahoo According to an embodiment, the title may be generated and/or adjusted based, at least in part, on one or more named entities within the sentence. If the branch of a particular node contains a recognized named entity, then cutting another branch of the tree may be preferred. For example, if a particular branch of the lowest level secondary class nodes contains a recognized named entity (i.e., the secondary class node or one of its children includes a recognized named entity), then the tree is cut at the next lowest level secondary class node that does not contain a named entity. If no other secondary class nodes exist, or all other secondary class nodes comprise a recognized named entity, then the particular branch may be cut.

For instance, the following sentence may be considered: Mary enjoys eating lunch at noon with the Queen of England. In one embodiment, the prepositional phrase at noon is cut first. Even though there are two other lower level PP nodes, these nodes are part of a branch of the tree that contains a recognized named entity (i.e., the Queen of England). Because the prepositional phrase at noon does not contain a recognized named entity, it is cut from the grammatical tree. The resulting sub-sentence is Mary enjoys eating lunch with the Queen of England.

The NER may also be used to adjust a title/summary and/or to determine whether a title/summary is too generic to be returned according to techniques described further below.

Adjusting the Title/Summary

In some instances, the resulting one or more sub-sentences will still exceed a maximum threshold size even when all secondary class nodes have been removed. For example, even if all PP, QP, DJP, ADVP, and SBAR have been removed from a sentence, the resulting sub-sentence may still have a very long noun phrase (NP) or verb phrase (VP).

If all secondary class nodes have been removed from the grammatical tree and the resulting sub-sentence still exceeds a maximum threshold size, then steps 204 to 212 may be performed for remaining phrase-level node types except noun phrases (NP). In one embodiment, if all nodes of node-type PP, QP, DJP, ADVP, and SBAR have been removed and the resulting sub-sentence still exceeds the maximum threshold size, then steps 204 to 212 are performed for nodes of node-type VP (Verb Phrase). That is, the lowest level VP node is identified and a branch of the tree is cut at that node. The process is repeated until the resulting sub-sentence is less than the maximum threshold size or all VP nodes have been cut from the grammatical tree.

For example, the following sentence may be considered: Afghan police officers and U.S. soldiers gather in Kandahar south of Kabul. In this example, a title of thirty characters or less needs to be extracted from the sentence to be associated with a photo in a news slideshow.

According to one embodiment, after the parser has analyzed the sentence, the parser outputs the following grammatical tree:

```
(ROOT
  (S
    (NP
      (NP (JJ Afghan) (NN police) (NNS officers))
      (CC and)
      (NP (NNP U.S.) (NNS soldiers)))
    (VP (VBP gather)
      (PP (IN in)
        (NP
```
-continued
```
          (NP (NNP Kandahar) (NN south))
          (PP (IN of)
            (NP (NNP Kabul))))))
    (. .)))
```

According to techniques described above, nodes with node-type "PP" are cut from the tree, which removes these nodes and their children from the tree and results in the following grammatical tree:

```
(ROOT
  (S
    (NP
      (NP (JJ Afghan) (NN police) (NNS officers))
      (CC and)
      (NP (NNP U.S.) (NNS soldiers)))
    (VP (VBP gather))
    (. .)))
```

The corresponding sub-sentence reconstructed from the above grammatical tree is: Afghan police officers and U.S. soldiers gather. (Note: the period may or may not be cut from the tree or omitted in the returned title/summary depending on the embodiment). This sub-sentence has more than thirty characters, which is greater than the length limit of the title. However, all of the secondary class nodes have been removed from the tree. The only remaining phrase-level nodes-types are Noun Phrases (NP) and Verb Phrases (VP). Thus, to further reduce the size of the sub-sentence, the node of node-type VP is cut. As a result, the following sub-sentence is generated: Afghan police officers and U.S. soldiers. This sub-sentence is less than thirty characters and is returned as the title.

In certain instances, the resulting sub-sentence may exceed the maximum threshold size, even if only the top-level NP is the only phrase-level node left in the grammatical tree. (The top-level NP generally corresponds to the subject of the sentence). For example, the following description of a news photo may be considered: Stoneworker James Lee of Colorado-based Engrave Write prepares a space on the Vietnam Veterans memorial in Washington, Tuesday, May 4, 2010, to add the name of Lt. Col. William L. Taylor. Taylor, of Tampa, Fla., was wounded in Vietnam Sep. 21, 1970, and died Jan. 23, 2009. In the first sentence of this description, the top-level NP is fifty-three characters long: Stoneworker James Lee of Colorado-based Engrave Write. Thus, the top-level NP needs to be trimmed down even more to return a title if the maximum threshold size is less than fifty-three characters.

In one embodiment, if NP node-types are the only remaining phrase-level node-types in the resulting sub-sentence and the sub-sentence still exceeds the maximum threshold size, then it is determined whether the sub-sentence contains a recognized named entity (e.g., the name of a person, organization, or location.) A Named Entity Recognition (NER) tool may be used to determine whether the sub-sentence contains a named entity according to techniques described above. If the sub-sentence contains a recognized named entity, then the recognized named entity is returned as the title. If the sub-sentence contains multiple recognized named entities, then the first one is returned. Continuing with the above-example James Lee is identified by the NER as a person's name. This name may be returned as the title. In one embodiment, nouns that directly precede a person's name may be assumed to be a person's title and may also be included in the returned title.

Thus, in the preceding example, Stoneworker James Lee would be returned as the title. If this sub-sentence still exceeds the maximum threshold, then the nouns directly preceding the person's name (i.e., Stoneworker) are truncated, and only the person name (James Lee) is returned as a title.

If the named entity extracted from the NP is still longer than the threshold size, then, according to one embodiment, only a portion of the named entity is returned as the title. For example, if the named entity comprises a person's name, then the first name of the person may be returned. If the NP contains multiple person names, only the first person's name is returned.

Avoiding Short Generic Result

In some cases, removing a set of nodes from the grammatical tree may result in a very short sub-sentence that contains only a generic concept. For example, the sentence A bar chart showing Greece's monthly debt payments for 2010 may be shortened to Bar chart. However, this phrase may be too generic to be useful as a title or summary.

Determining whether a sentence is too generic may be based on one or more criteria. According to one embodiment, the determination is based, at least in part, on the size of the sub-sentence. If the sentence is below a certain a minimum threshold size, then the sentence may be considered too short to be used as a summary or title.

In one embodiment, the determination may also be based on whether the sub-sentence contains a recognized named entity. For example, even if the sub-sentence is shorter than the minimum threshold size, the sub-sentence may still be returned as a title if it contains a recognized named entity (e.g. a person's name). If the sub-sentence is shorter than the minimum threshold size and the sub-sentence does not contain a recognized named entity, then the sub-sentence is determined as too generic to be returned.

In one embodiment, if the sub-sentence is determined too generic to be returned as a title or summary, then the result is rolled back to the previous sub-sentence that was generated. For example, the following sentence may be considered: A bar chart showing Greece's monthly debt payments for 2010. In this example, a title of forty characters or less needs to be extracted from this sentence. The parser outputs the following grammatical tree:

According to techniques herein, the PP and DT node will be cut from the tree, resulting in the following sub-sentence: Bar chart showing Greece's monthly debt payments. This sentence is still longer than the threshold size limit. Thus, according to an embodiment, the VP node will be cut from the tree because there are no secondary class nodes to cut. The resulting sub-sentence is: Bar chart. This sub-sentence may be determined to be too generic to return as a title because it is too short (e.g., less than a minimum threshold number of characters) and does not contain a named entity. According to one embodiment, the resulting sub-sentence is rolled back to the previous sub-sentence: Bar chart showing Greece's monthly debt payments. Assuming the length limit is forty characters, because the result is greater than forty characters, the resulting title will be truncated. For example, the resulting title that is displayed may look like the following: "Bar chart showing Greece's monthly . . . ." Depending on the application for which the title is generated, the truncated title may be a better result than the generic title.

Alternatively, if the sub-sentence is determined to be too generic, another approach comprises selecting one or more different sentences from the long body of text to generate the title or summary. For example, the first sentence from a news story might be selected to generate a title for a corresponding photo. If the resulting title that is generated is determined to be too generic, then the second sentence from the story may be selected. The techniques described herein may be performed to generate a title based on the second sentence.

Removing Trivial Words/Phrases

According to one embodiment, trivial words and phrases are determined and removed from the one or more sentences without regard to threshold size limit or their position in a tree. The grammatical tree may be used to easily identify trivial words to remove based on the word-level node-type of a particular node. Although word-level node-types may also be classified as secondary class nodes and be removed according to the techniques described above, it may be desirable to remove these nodes regardless of the length of a resulting sub-sentence or a position of the node within the grammatical tree.

For example, certain parts-of-speech are generally omitted from titles, such as definite and indefinite articles. Words associated with a particular part-of-speech may be easily identified based on the word-level node-types of the grammatical tree. Consider the following sentence: A bar chart showing the yearly depreciation in housing prices. The parser generates the following grammatical tree:

In one embodiment, all DT nodes identified and cut from the tree. The resulting sub-sentence is: Bar chart showing yearly depreciation in housing prices. Additional nodes (e.g., secondary class nodes), may then be removed according to techniques described above.

In one embodiment, trivial words and/or phrases are removed before the parser generates a grammatical tree for the one or more sentences. For example, articles may be identified and removed before the parse tree is even generated. Also, in certain instances, some phrases within a sentence are not directly related to the story of the sentence and, therefore, can be removed without affecting the understanding of the story. Also, removing certain words and/or phrases may help prevent the parser from generating an incorrect grammatical tree. Therefore, in one embodiment, these words and/or phrases are deleted from the sentences before they are sent to the parser to generate a grammatical tree.

For example the following sentence may be considered: This Jan. 31, 2006 file photo shows an acorn woodpecker dangling from a tree as it looks for food at Rancho San Antonio Park in Los Altos, Calif. The words preceding an acorn woodpecker are not directly related to the story and are therefore removed from the sentence. If not removed, the words would also cause the Stanford Parser, or possibly another parser depending on which parser is used, to generate an incorrect grammatical tree. These phrases may be identified based on a set of regular expression filters, each of which is created based on a heuristic rule. By removing these words before generating the grammatical tree, a higher quality title or summary may be generated.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
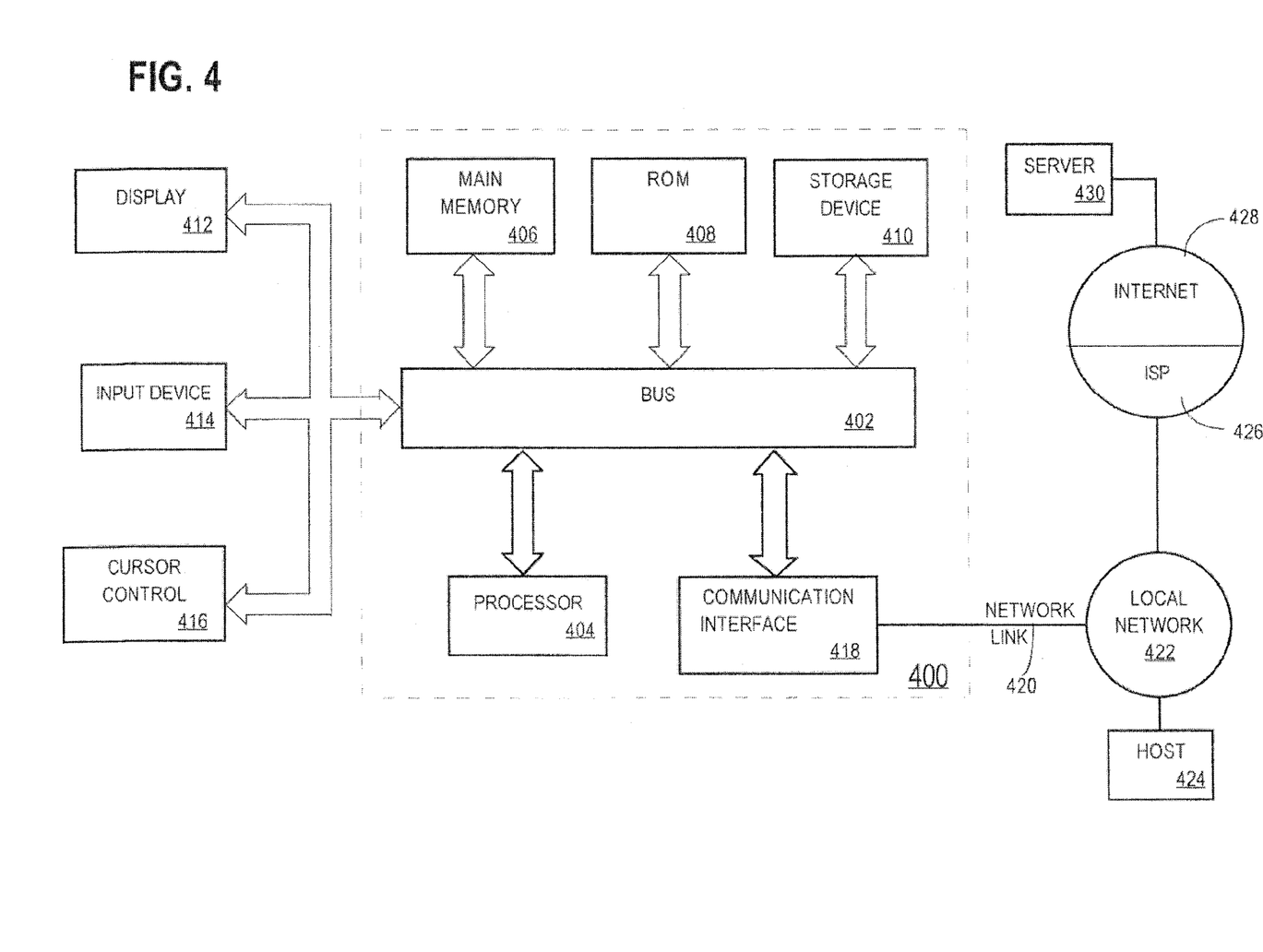
FIG. 4 is a block diagram of a computer system on which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating shorter versions of one or more sentences, the method comprising:
   receiving, by a computing device, the one or more sentences from a text;
   based on the one or more sentences, generating, by the computing device within a memory of the computing device, a tree comprising a plurality of nodes;
   wherein the tree represents the one or more sentences;
   wherein each node, of the plurality of nodes, represents a grammatical element of the one or more sentences;
   using a named entity recognizer, automatically recognizing which nodes, of the plurality of nodes, represent grammatical elements that correspond to recognized named entities;
   selecting a particular node from the tree based, at least in part, on (a) which nodes in the tree correspond to recognized named entities, (b) a position of the particular node within the tree, and (c) a node type of the particular node;
   wherein the particular node has no children within the tree that correspond to recognized named entities identified by the named entity recognizer;
   after said selecting, modifying the tree within the memory of the computing device by removing the particular node and children of the particular node from the tree;
   after removing, from the tree, the particular node and the children of the particular node, generating, from remaining nodes of the tree a first set of one or more sub-sentences; wherein the first set of one or more sub-sentences are shorter in length than said one or more sentences;
   causing display of at least one sub-sentence generated from remaining nodes of the tree to a user.

2. The method of claim 1, wherein the tree represents a grammatical structure of the one or more sentences and wherein said step of selecting is further based on the grammatical structure of the one or more sentences represented by the tree.

3. The method of claim 2, wherein the node type is associated with a grammatical element of the grammatical structure of the one or more sentences.

4. The method of claim 3, wherein the node-type of the at least one node is a secondary class node type and said step of selecting comprises:
   determining which node has a secondary class node type, that is at a lower position within the grammatical tree than any other node having a secondary class node type.

5. The method of claim 4, wherein the secondary class node type comprises at least one of a node type representing a prepositional phrase, an adjective phrase, an adverbial phrase, or a dependent clause.

6. The method of claim 1, further comprising:
   determining whether a size of the first set of one or more sub-sentences exceeds a maximum threshold;
   in response to determining that the size of the first set of one or more sub-sentences exceeds the maximum threshold, performing the following:
      determining a second set of one or more nodes to remove from the tree;
      based on said determining, removing said second set of one or more nodes of the plurality of nodes from the tree;
      after said removing, reconstructing, from the remaining nodes of the plurality of nodes, a second set of one or more sub-sentences of said one or more sentences, wherein the second set of one or more sub-sentences are shorter in length than said first set of one or more sentences.

7. The method of claim 6, further comprising:
   determining that a size of the second set of one or more sub-sentences is less than a minimum threshold;
   in response to determining that the size of the second set of one or more sub-sentences is less than the minimum threshold, determining whether the second set of one or more sub-sentences contains a named entity;
   if said second set of one or more sub-sentences contains a recognized named entity, returning the second set of one or more sub-sentences as a title;

if said second set of one or more sub-sentences does not contain a recognized named entity, returning said first set of one or more sub-sentences as a title.

8. The method of claim 1, further comprising:
before said step of generating the tree:
determining, based on a filter that identifies words that are not directly related to a story of the one or more sentences, a set of one or more words to remove from the one or more sentences;
removing the set of one or more words from the one or more sentences.

9. The method of claim 1, wherein the one or more sentences are from an article associated with an image, the method further comprising:
returning the one or more sub-sentences as a title for said image.

10. A non-transitory computer-readable storage medium that stores instructions which, when executed by one or more processors, cause the one or more processors to perform steps for generating shorter versions of one or more sentences comprising:
receiving, by a computing device, the one or more sentences from a text;
based on the one or more sentences, generating, by the computing device within a memory of the computing device, a tree comprising a plurality of nodes;
wherein the tree represents representing the one or more sentences;
wherein each node, of the plurality of nodes, represents a grammatical element of the one or more sentences;
using a named entity recognizer, automatically recognizing which nodes, of the plurality of nodes, represent grammatical elements that correspond to recognized named entities;
selecting a particular node from the tree based, at least in part, on (a) which nodes in the tree correspond to recognized named entities, (b) a position of the particular node within the tree, and (c) a node type of the particular node;
wherein the particular node has no children within the tree that correspond to recognized named entities identified by the named entity recognizer;
after said selecting, modifying the tree within the memory of the computing device by removing the particular node and children of the particular node from the tree;
after removing, from the tree, the particular node and the children of the particular node, generating, from remaining nodes of the tree, a first set of one or more sub-sentences; wherein the first set of one or more sub-sentences are shorter in length than said one or more sentences;
causing display of at least one sub-sentence generated from remaining nodes of the tree to a user.

11. The non-transitory computer-readable medium of claim 10, wherein the tree represents a grammatical structure of the one or more sentences and wherein said step of selecting is further based on the grammatical structure of the one or more sentences represented by the tree.

12. The non-transitory computer-readable medium of claim 11, wherein the node type is associated with a grammatical element of the grammatical structure of the one or more sentences.

13. The non-transitory computer-readable medium of claim 12, wherein the node-type of the at least one node is a secondary class node type and instructions for said selecting comprise instructions for:
determining which node has a secondary class node type, that is at a lower position within the grammatical tree than any other node having a secondary class node type.

14. The non-transitory computer-readable medium of claim 13, wherein the secondary class node type comprises at least one of a node type representing a prepositional phrase, an adjective phrase, an adverbial phrase, or a dependent clause.

15. The non-transitory computer-readable medium of claim 10, further comprising instructions which, when executed by one or more processors, cause the one or more processors to perform steps comprising:
determining whether a size of the first set of one or more sub-sentences exceeds a maximum threshold;
in response to determining that the size of the first set of one or more sub-sentences exceeds the maximum threshold, performing the following:
determining a second set of one or more nodes to remove from the tree;
based on said determining, removing said second set of one or more nodes of the plurality of nodes from the tree;
after said removing, reconstructing, from the remaining nodes of the plurality of nodes, a second set of one or more sub-sentences of said one or more sentences, wherein the second set of one or more sub-sentences are shorter in length than said first set of one or more sentences.

16. The non-transitory computer-readable medium of claim 15, further comprising which, when executed by one or more processors, cause the one or more processors to perform steps comprising:
determining that a size of the second set of one or more sub-sentences is less than a minimum threshold;
in response to determining that the size of the second set of one or more sub-sentences is less than the minimum threshold, determining whether the second set of one or more sub-sentences contains a named entity;
if said second set of one or more sub-sentences contains a recognized named entity, returning the second set of one or more sub-sentences as a title;
if said second set of one or more sub-sentences does not contain a recognized named entity, returning said first set of one or more sub-sentences as a title.

17. The non-transitory computer-readable medium of claim 10, further comprising instructions for performing:
before said generating the tree:
determining, based on a filter that identifies words that are not directly related to a story of the one or more sentences, a set of one or more words to remove from the one or more sentences;
removing the set of one or more words from the one or more sentences.

18. The non-transitory computer-readable medium of claim 10, wherein the one or more sentences are from an article associated with an image, the instructions further causing the one or more processors to perform:
returning the one or more sub-sentences as a title for said image.

19. The method of claim 1, further comprising comparing a length of the first set of one or more sub-sentences with a threshold value.

20. The method of claim 1, wherein the at least one sub-sentence includes the first set of one or more sub-sentences.

* * * * *

UNITED STATES PATENT AND TRADEMARK OFFICE
CERTIFICATE OF CORRECTION

| | | |
|---|---|---|
| PATENT NO. | : 9,317,595 B2 | |
| APPLICATION NO. | : 12/960828 | |
| DATED | : April 19, 2016 | |
| INVENTOR(S) | : Xin Li and Hongjian Zhao | |

It is certified that error appears in the above-identified patent and that said Letters Patent is hereby corrected as shown below:

In the Claims

Column 15
Claim 10: Line 27: Delete "tree represents representing the" and insert --tree represents the--.

Signed and Sealed this
Seventh Day of June, 2016

Michelle K. Lee
*Director of the United States Patent and Trademark Office*